(12) United States Patent
Halle et al.

(10) Patent No.: US 6,251,314 B1
(45) Date of Patent: Jun. 26, 2001

(54) PROCESS FOR THE PREPARATION OF MICROENCAPSULATED POLYMERS

(75) Inventors: Olaf Halle, Köln; Werner Strüver; David Bryan Harrison, both of Leverkusen; Wolfgang Podszun, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/326,745

(22) Filed: Jun. 4, 1999

(30) Foreign Application Priority Data

Jun. 12, 1998 (DE) ............................................... 198 26 048
Jul. 29, 1998 (DE) ............................................... 198 34 103

(51) Int. Cl.$^7$ ............................... B01J 13/02; C08K 5/13
(52) U.S. Cl. ........................... 264/4.1; 264/4.3; 264/4.33; 264/4.7; 524/736; 524/767; 526/82; 526/210; 526/212; 526/216; 526/227
(58) Field of Search ............................ 264/4.1, 4.3, 4.33, 264/4.7; 524/736, 767; 526/82, 210, 212, 216, 227

(56) References Cited

U.S. PATENT DOCUMENTS

| | | | |
|---|---|---|---|
| 4,427,794 | 1/1984 | Lange et al. | 521/28 |
| 5,834,524 | 11/1998 | Bloodworth et al. | 521/30 |
| 5,932,152 * | 8/1999 | Podszun et al. | 264/4.1 |
| 6,060,558 * | 5/2000 | Podszun et al. | 524/704 |

FOREIGN PATENT DOCUMENTS

| | | |
|---|---|---|
| 196 47 291 | 5/1998 | (DE) . |
| 0 051 210 | 12/1985 | (EP) . |
| 0 098 130 | 11/1989 | (EP) . |
| 0 101 943 | 8/1990 | (EP) . |
| 1 602 064 | 5/1978 | (GB) . |

* cited by examiner

Primary Examiner—Samuel A. Acquah
(74) Attorney, Agent, or Firm—Joseph C. Gil; Richard E. L. Henderson

(57) ABSTRACT

The present invention relates to a process for the preparation of microencapsulated polymers having a high surface smoothness, a soluble fraction of less than 6%, and a swelling index of between 1.3 and 9 by polymerizing a microencapsulated monomer mixture suspended in an aqueous phase containing at least one hydroxyaromatic compound as polymerization inhibitor, wherein the microencapsulated monomer mixture contains (a) 34 to 99.7% by weight of a monomer having one polymerizable C=C double bond,
(b) 0.1 to 15% by weight of a crosslinking agent having at least 2 polymerizable C=C double bonds,
(c) 0.2 to 1.0% by weight of at least one aliphatic peroxyester as polymerization initiator, and
(d) 0 to 50% by weight of additives, the percentages being based on the sum of the components (a) to (c).

4 Claims, No Drawings

PROCESS FOR THE PREPARATION OF MICROENCAPSULATED POLYMERS

BACKGROUND OF THE INVENTION

The invention relates to a process for the preparation of microencapsulated polymers of high surface quality by polymerization of monomers enclosed in microcapsules, which leads to polymers having a soluble fraction of less than 6% and a swelling index between 1.3 and 9.

Ion exchangers having as uniform a particle size as possible (referred to below as "monodisperse") have recently become increasingly important because economic advantages can be obtained in many applications due to the more advantageous hydrodynamic properties of an exchanger bed of monodisperse ion exchangers. Monodisperse ion exchangers can be obtained by functionalizing monodisperse bead polymers. One possible method for preparing monodisperse bead polymers comprises producing monodisperse monomer droplets by spraying monomers into a continuous phase and then curing the droplets by polymerization. The formation of uniform droplet sizes can be supported by excitation of vibrations. For example, European Patent Application 51,210 describes a process for the preparation of spherical monomer droplets having a uniform particle size by excitation of vibrations in a laminar monomer stream. If it is intended to retain the monodispersity of the monomer droplets in the polymerization, coalescence and formation of new droplets must be excluded. A particularly effective method for preventing coalescence and formation of new droplets comprises the microencapsulation of the droplets according to European Patent Application 46,535.

A further possible method of preparing monodisperse bead polymers is the so-called seed/feed process, in which a monodispersed polymer ("seed") is swollen in the monomer and the latter is then polymerized. Seed/feed-processes are described, for example, in European Patent Applications 98,130 and 101,943. One possible method for particularly exact transfer of the particle size distribution of the seed polymer to the bead polymer is described in German Patent Application 19,634,393. Here, a microencapsulated polymer is used as a seed.

Microencapsulated seed polymers should have a high swelling index so that they can absorb a large amount of the added monomer in the seed/feed process. The swelling index ("SI") is defined as the quotient of the volume of the swollen polymer and the volume of the polymer which has not swollen. The swelling index can be controlled in a known manner by the content of crosslinking agents: low contents of crosslinking agents lead to high swelling indices and vice versa. Thus, for example, styrene polymers which are crosslinked with 0.2 to 2.0% by weight of divinylbenzene have swelling indices of 2.5 to 10 in toluene. However, seed polymers having a low degree of crosslinking have a very high fraction of uncrosslinked, soluble polymers. This fraction of uncrosslinked, soluble polymers in the seed polymer is undesired in many respects:

1. The polymerization of the swollen seed may be impaired by the fact that the polymer fractions dissolved from the seed by the added monomer cause the particles to adhere to one another.
2. The functionalization for the preparation of the ion exchanger can be complicated because the dissolved-out polymer fractions accumulate in the reaction solutions used for the functionalization.
3. The end products (i.e., ion exchangers) may contain large amounts of soluble polymer, which may lead to undesired leaching of the ion exchangers.

It has been found that the polymerization of microencapsulated monomer droplets does not always lead to bead polymers having smooth surfaces. Instead, bead polymers having rough and/or coated surfaces may form. For many applications, surface roughness or a surface coating is not a disadvantage, especially since a surface coating can be removed by an after treatment or can be removed with the capsule wall upon functionalization of the bead polymer to give the ion exchanger. For some applications, however, bead polymers having smooth surfaces are desired, for example, for the use of the bead polymers as seed in a so-called seed/feed process. German Patent Application 19,647,291 states that the addition of water-soluble inhibitors during polymerization of microencapsulated monomer droplets leads to bead polymers having a smooth surface. However, in addition to a smooth surface and a high swelling index, these bead polymers have a soluble fraction that is undesirably high relative to the swelling index.

The object of the present invention is the provision of microencapsulated crosslinked spherical polymers having high surface smoothness, a swelling index between 1.3 and 9, and a content of soluble fractions of less than 6%.

It has been found that polymers having a low content of crosslinking agents and correspondingly high swellability have smooth surfaces and low contents of soluble polymer fractions particularly when, during their preparation, hydroxyaromatic compounds are used as polymerization inhibitors in the aqueous phase and peroxyesters are used as initiators.

SUMMARY OF THE INVENTION

The present invention, therefore, relates to a process for the preparation of microencapsulated polymers having a high surface smoothness, a soluble fraction of less than 6%, and a swelling index of between 1.3 and 9 comprising polymerizing a microencapsulated monomer mixture suspended in an aqueous phase containing at least one hydroxyaromatic compound as polymerization inhibitor, wherein the microencapsulated monomer mixture comprises (a) 34 to 99.7% by weight (preferably 34 to 99.2% by weight, particularly preferably 39 to 99.2% by weight, very particularly preferably 44 to 99.2% by weight, exceedingly preferably 47 to 99.2% by weight) of a monomer having one polymerizable C=C double bond, (b) 0.1 to 15% by weight (preferably 0.6 to 15% by weight, particularly preferably 0.6 to 10% by weight, very particularly preferably 0.6 to 5% by weight, exceedingly preferably 0.6 to 2% by weight) of a crosslinking agent having at least 2 (preferably 2 or 3) polymerizable C=C double bonds, (c) 0.2 to 1.0% by weight of at least one aliphatic peroxyester as polymerization initiator, and (d) 0 to 50% by weight (preferably 0 to 40% by weight) of additives, the percentages being based on the sum of the components (a) to (c).

DETAILED DESCRIPTION OF THE INVENTION

The microencapsulated polymers prepared according to the invention can be converted into ion exchangers directly or through an intermediate stage by a seed/feed process using polymer particles enlarged by functionalization.

"Monomers" are understood as meaning compounds having one polymerizable C=C-double bond, such as, for example, styrene, vinyltoluene, ethylstyrene, α-methylstyrene, chlorostyrene, chloromethylstyrene, acrylic acid, methacrylic acid, acrylates, methacrylates, acrylonitrile, methacrylonitrile, acrylamide, methacrylamide, and mixtures of these compounds. Styrene and mixtures of styrene and the above-mentioned monomers are preferred.

Compounds having at least 2 (preferably 2 or 3) polymerizable C═C double bonds can be used as crosslinking agents. Preferred crosslinking agents include divinylbenzene, divinyltoluene, trivinylbenzene, divinylnaphthalene, trivinyinaphthalene, diethylene glycol divinyl ether, 1,7-octadiene, 1,5-hexadiene, ethylene glycol dimethacrylate, triethylene glycol dimethacrylate, trimethylolpropane trimethacrylate, allyl methacrylate, and methylene-N,N'-bisacrylamide. The type of crosslinking agent can be chosen according to the subsequent use of the polymer. Thus, for example, acrylate or methacrylate crosslinking agents are not very suitable if a cationic exchanger is to be prepared from the polymer by sulfonation, since the ester bond is cleaved under the sulfonation conditions. Divinyl-benzene is suitable in many cases, particularly for the preparation of strongly acidic cationic exchangers. For most applications, commercial quality divinylbenzene that also contains ethylvinylbenzene in addition to the isomers of divinylbenzene are sufficient. The monomers should be substantially insoluble in the aqueous phase. Monomers that partially soluble in water, such as acrylic acid, methacrylic acid, and acrylonitrile, are therefore preferably used as a mixture with water-insoluble monomers. It is also possible to reduce the solubility of the monomers in the aqueous phase by addition of salt.

The materials known for this intended use, particularly polyesters, natural and synthetic polyamides, polyurethanes, and polyureas, are suitable for the microencapsulation of the monomer droplets. Gelatin is particularly suitable as natural polyamide. This is used in particular as a coacervate and complex coacervate. Gelatin-containing complex coacervates for the purposes of the invention are understood to mean in particular combinations of gelatin and synthetic polyelectrolytes. Suitable synthetic polyelectrolytes are copolymers with incorporated units of, for example, maleic acid, acrylic acid, methacrylic acid, acrylamide, and methacrylamide. Gelatin-containing capsule walls can be hardened with customary auxiliaries, such as, for example, formaldehyde or glutardialdehyde. Gelatin-containing capsule materials are preferred for the purposes of the invention.

The encapsulation of monomer droplets with gelatin, gelatin-containing coacervates, and gelatin-containing complex coacervates is described, for example, in European Patent Application 46,535. The methods of encapsulation with synthetic polymers are known. For example, phase boundary condensation, in which a reactive component (for example, an isocyanate or an acid chloride) dissolved in the monomer droplet is reacted with a second reactive component (for example, an amine) dissolved in the aqueous phase, is suitable for this purpose.

The monomers to be encapsulated also contain, in addition to crosslinking agents, at least one initiator for initiating the polymerization. Polymerization initiators (c) suitable for the process according to the invention are aliphatic peroxyesters corresponding to the formulas (I), (II), or (III)

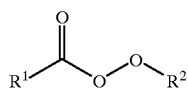
Formula (I)

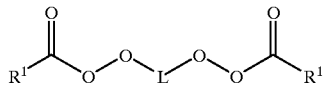
Formula (II)

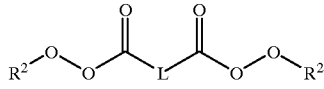
Formula (III)

in which
  $R^1$ denotes an alkyl radical having 2 to 20 carbon atoms or a cycloalkyl radical having up to 20 carbon atoms,
  $R^2$ denotes a branched alkyl radical having 4 to 12 carbon atoms and
  L denotes an alkylene radical having 2 to 20 carbon atoms or a cycloalkylene radical having up to 20 C atoms.

Preferred aliphatic peroxyesters according to the formula (I) include, for example, tert-butyl peroxyacetate, tert-butyl peroxyisobutyrate, tertbutyl peroxypivalate, tert-butyl peroxyoctanoate, tert-butyl peroxy-2-ethylhexanoate, tert-butyl peroxyneodecanoate, tert-amyl peroxyneodecanoate, tert-amyl peroxypivalate, tert-amyl peroxyoctanoate, and tert-amyl peroxy-2-ethylhexanoate.

Preferred aliphatic peroxyesters according to the formula (II) include, for example, 2,5-bis(2-ethylhexanoylperoxy)-2,5-dimethylhexane, 2,5-dipivaloyl-2,5-dimethylhexane, and 2,5-bis(2-neodecanoylperoxy)-2,5-dimethylhexane.

Preferred aliphatic peroxyesters according to the formula (III) include, for example, di-tert-butyl peroxyazelate and di-tert-amyl peroxyazelate.

Particularly preferred aliphatic initiators correspond to the formula (I). The initiators are generally used in amounts of 0.05 to 2.5% by weight (preferably 0.2 to 1.0% by weight, particularly preferably 0.3 to 0.8% by weight) based on the total amount of monomer and crosslinking agent.

The monomers being encapsulated may also contain additives. Suitable additives include, for example, porogens, which produce a macroporous structure in the polymer. Organic solvents that dissolve or swell the resulting polymer poorly are suitable for this purpose. Hexane, octane, isooctane, isododecane, methyl ethyl ketone, and octanol may be mentioned by way of example.

Further suitable additives include polymers. Preferred polymers are those with the above-mentioned monomers, particularly preferably those of styrene.

The mean particle size of the encapsulated monomer droplets is preferably 10 to 1000 μm, particularly 100 to 1000 μm. The process according to the invention is suitable for the preparation of monodisperse polymers, in particular those which are described in European Patent Application 46,535.

Polymerization inhibitors for the purposes of the invention are hydroxyaromatic compounds that slow down or completely suppress the free radical polymerization of compounds having polymerizable C═C double bonds.

Hydroxyaromatic compounds include unsubstituted hydroxyaromatics such as resorcinol, hydroquinone, pyrocatechol, and pyrogallol, as well as substituted hydroxyaromatics such as hydroquinone monomethyl ether, tert-butyl pyrocatechol, p-nitrosophenol, and condensates of phenols with aldehydes. Resorcinol is particularly preferred.

It has often proved advantageous for the polymerization inhibitors used according to the invention to be soluble in the aqueous phase. In this context, "soluble" means that at least 1000 ppm can be dissolved in the aqueous phase at 70° C. without leaving a residue. This can often be influenced by a suitable choice of the conditions. For example, the solubility of a phenolic inhibitor can be improved by a high pH.

The amount of polymerization inhibitor is chosen so that the polymerization of monomer or monomer and crosslinking agent outside the capsule wall is prevented. The required amount of polymerization inhibitor depends not only on the amount of the polymerization inhibitor used but also substantially on the inhibitor activity and on the solubility of the inhibitor in the aqueous phase. The optimum amount can be determined by experiments. The inhibitor content of commercial crosslinking agents, which is generally between 0.001 and 0.01% by weight, based on crosslinking agent, is not sufficient for the purposes of the present invention but, together with the inhibitor additionally added, it contributes to the desired effect. Customary amounts of polymerization inhibitor are in the range from 10 to 1000 ppm (preferably 10 to 500 ppm, in particular 10 to 250 ppm, very particularly preferably 20 to 200 ppm) based on the total amount of the aqueous phase and inhibitor.

Commercial monomers and crosslinking agents may contain inhibitors for stabilization. However, the concentration is so low that the concentration required for the invention is not reached in the aqueous phase and the effect according to the invention does not occur.

The polymerization of the encapsulated monomer droplet to give the spherical polymer can expediently be carried out in the presence of one or more protective colloids and, optionally, of a buffer system in the aqueous phase. Protective colloids comprise natural and synthetic water-soluble polymers, such as gelatin, starch, polyvinyl alcohol, polyvinyl pyrrolidone, polyacrylic acid, polymethacrylic acid, and copolymers of acrylic acid, methacrylic acid, acrylates, and methacrylates. Cellulose derivatives, particularly cellulose esters and cellulose ethers such as carboxymethylcellulose, methylhyd roxyethylcellulose, methylhydroxypropylcellulose, and hydroxyethylcellulose, are also very suitable. For the polymerization of monomer droplets encapsulated with gelatin or gelatin-containing complex coacervates, gelatin is particularly suitable as a protective colloid. The amount of protective colloids used is generally 0.025 to 1.5% by weight (preferably 0.05 to 0.75% by weight) based on the aqueous phase.

The polymerization can be carried out in the presence of a buffer system. Buffer systems that adjust the pH of the aqueous phase at the beginning of the polymerization to a value between pH 14 and 6 (preferably between pH 12 and 8) are preferred. Under these conditions, protective colloids having carboxyl groups are present completely or partially as salts. The action of the protective colloid is advantageously influenced in this way. Particularly suitable buffer systems contain phosphates or borates. For the purposes of the invention, the terms phosphate and borate also include condensates of the orthoforms of corresponding acids and salts. The concentration of phosphate or borate in the aqueous phase is 0.5 to 500 mmol/l (preferably 2.5 to 100 mmol/l).

The stirring speed in the polymerization is not very critical and, in contrast to the conventional bead polymerization, has no effect on the particle size. Low stirring speeds that are sufficient to keep the microcapsules in suspension and support the removal of the polymerization are used. Various stirrer types can be used for this task. Gate agitators having an axial action are particularly suitable.

The volume ratio of encapsulated monomer droplets to aqueous phase is generally 1:0.75 to 1:20 (preferably 1:1 to 1:6).

The polymerization temperature depends on the decomposition temperature of the initiator used. It is generally 50 to 150° C. (preferably 55 to 100° C.). The polymerization takes 0.5 hour to a few hours. It has proved useful to employ a temperature program in which the polymerization is started at low temperature (for example, 60° C.) and the reaction temperature is increased with progressive conversion in the polymerization. For example, the requirement for a safe course of reaction and high conversion in the polymerization can be very readily met in this way. After the polymerization, the polymer can be isolated by customary means, for example, by filtration or decanting, and, optionally after one or more washes, can be dried.

The material of the capsule wall is present essentially on the surface of the bead polymer. If desired, this material can be removed by an after treatment. Gelatin and gelatin-containing complex coacervates can be readily washed off with acids or alkalis. In most cases, however, it is not necessary to wash off the capsule wall material separately since it is in any case removed under the conditions of a functionalization of the polymer to give ion exchangers.

The bead polymers prepared by the process according to the invention are distinguished by a smooth surface and by a small soluble fraction, relative to the swelling index.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Soluble Fractions

To determine the soluble fractions, 5 to 7 g of bead polymer were weighed into an extraction thimble and extracted overnight with 800 ml of toluene in a Soxhlet apparatus (bath temperature 140° C.). The extract was filtered over a suction filter with a Schwarzband filter and evaporated down to about 1 ml in a rotary evaporator. Subsequently 300 ml of methanol were added and drying was carried out in vacuo on a rotary evaporator to constant weight. A double determination was carried out for each sample.

Swelling

The swelling of the bead polymers was investigated in toluene at room temperature. For this purpose, 10 ml of dried, sieved bead polymer were weighed into 100 ml-glass cylinder. The quotient of the volume of the bed ($V_0$) and the amount weighed in (m) gave the bulk volume ($V_{bulk}$). The glass cylinder was filled to 100 ml with the swelling agent and allowed to stand for 10 to 20 hours. Shaking was carried out frequently and it was ensured that any air bubbles occurring could escape. The volume of the swollen bed was read and gave $V_1$. By definition, the quotient of $V_1$ and $V_0$ is the volume swelling index ($SI_{v/v}$).

Example 1 (according to the invention)
Preparation of a Microencapsulated Polymer Into 1960 ml of demineralized water initially introduced into a four-liter glass reactor were added 630 g of a microencapsulated mixture of 0.5% by weight of divinylbenzene and 0.3% by weight of ethylstyrene (used together as 63% strength commercial divinylbenzene isomer mixture in ethylstyrene), 0.5% of tert-butyl peroxy-2-ethylhexanoate, and 98.7% of styrene, for which the microcapsule consisted of a complex coacervate hardened with formaldehyde and comprising gelatin and an acrylamide/acrylic acid copolymer. The mean particle size was 231 μm. A solution of 2.4 g of gelatin, 4 g of sodium hydrogen phosphate dodecahydrate, and 100 mg of resorcinol (corresponding to 49 ppm, based on the aqueous phase) in 80 ml of demineralized water was added to the mixture, slow stirring was carried out, and polymerization was carried out for 10 hours at 75° C. while stirring. Polymerization was then completed by increasing the temperature to 95° C. The batch was washed over a 32 μm sieve and dried. 605 g of spherical, microencapsulated polymer having a smooth surface was obtained. The polymer appeared optically transparent and the mean particle size was 220 μm. The polymer had a swelling index of 6.0 and a soluble fraction of 1.8%.

Example 2 (according to the invention)
Preparation of a microencapsulated polymer without a surface coating Example 2 was carried out analogously to Example 1, except that a mixture of 0.43% by weight of divinylbenzene and 0.25% by weight of ethylstyrene (used together as 63% strength, commercial isomer mixture of divinylbenzene and ethylstyrene), 0.5% by weight of tert-butyl peroxy-2-ethylhexanoate, and 98.82% by weight of styrene was used as the monomer. The mean size of the microencapsulated monomer droplets was 231 μm. 605 g of a spherical, microencapsulated polymer without a surface coating were obtained. The polymer appeared optically transparent and the mean particle size was 220 μm. The polymer had a swelling index of 6.6 and a soluble fraction of 2.4%.

Example 3 (according to the invention)
Preparation of a Microencapsulated Polymer Without a Surface Coating Example 3 was carried out analogously to Example 1, except that a mixture of 1.5% by weight of divinylbenzene and 0.9% by weight of ethylstyrene (63% strength, commercial isomer mixture of divinylbenzene and ethylstyrene), 0.5% by weight of tert-butyl peroxy-2-ethylhexanoate, and 97.1% by weight of styrene was used as the monomer. The mean size of the microencapsulated monomer droplets was 275 μm. 605 g of a spherical, microencapsulated polymer without a surface coating were obtained. The polymer appeared optically transparent and the mean particle size was 260 μm. The polymer had a swelling index of 3.9 and a soluble fraction of 0.35%.

Example 4 (according to the invention)
Preparation of a Microencapsulated Polymer Without a Surface Coating Example 4 was carried out analogously to Example 1, except that a mixture of 5% of divinylbenzene and 3% of ethylbenzene (used together as 63% strength, commercial isomer mixture of divinylbenzene and ethylstyrene), 0.5% of tert-butyl peroxy-2-ethylhexanoate, and 91.5% of styrene was used as the monomer. The mean size of the microencapsulated monomer droplets was 350 μm. 605 g of a spherical, microencapsulated polymer without a surface coating were obtained. The polymer appeared optically transparent and the mean particle size was 332 μm. The polymer had a swelling index of 2.1 and a soluble fraction of 0.1%.

Example 5 (Comparative Example)
Preparation of a Microencapsulated Polymer Having a Thick Surface Coating, High Swelling Index and a Small Soluble Fraction Example 5 was carried out analogously to Example 1, except that no resorcinol was used. 605 g of a spherical, microencapsulated polymer having a thick pelt-like surface coating were obtained. The polymer appeared white and opaque. The polymer had a swelling index of 6.0 and a soluble fraction of 1.8%.

Example 6 (Comparative Example from Example 7 of German Patent Application 19,647,291)
Preparation of a Microencapsulated Polymer Without a Surface Coating but with High Swelling Index and Large Soluble Fraction Into 1580 ml of demineralized water initially introduced into a 4 l glass reactor were added 790 g of a microencapsulated mixture of 0.5% by weight of divinylbenzene and 0.3% by weight of ethylstyrene (used together as 63% strength, commercial isomer mixture of divinylbenzene and ethylstyrene), 0.75% by weight of dibenzoyl peroxide, and 98.45% by weight of styrene, for which the microcapsule consisted of a complex coacervate hardened with formaldehyde and comprising gelatin and a copolymer of acrylamide and acrylic acid. The mean particle size was 231 μm. A solution of 2.4 g of gelatin, 4 g of sodium hydrogen phosphate dodecahydrate, and 350 mg of resorcinol in 80 ml of demineralized water was added to the mixture, which was slowly stirred, and polymerization was completed by increasing the temperature while stirring. The batch was washed over a 32 μm sieve and dried. 760 g of a spherical, microencapsulated polymer having a smooth surface were obtained. The polymer appeared optically transparent and the mean particle size was 220 μm. The polymer had a swelling index of 6.6 and a soluble fraction of 8.5%.

What is claimed is:

1. A process for the preparation of microencapsulated polymers having a high surface smoothness, a soluble fraction of less than 6%, and a swelling index of between 1.3 and 9 comprising polymerizing a microencapsulated monomer mixture suspended in an aqueous phase containing as a polymerization inhibitor 20 to 200 ppm, based on total amount of the aqueous phase and the inhibitor, of at least one hydroxyaromatic compound, wherein the microencapsulated monomer mixture comprises (a) 34 to 99.7% by weight of a monomer having one polymerizable C=C double bond,
   (b) 0.1 to 15% by weight of a crosslinking agent having at least 2 polymerizable C=C double bonds,
   (c) 0.2 to 1.0% by weight of at least one aliphatic peroxyester as polymerization initiator, and
   (d) 0 to 50% by weight of additives, the percentages for components (a) to (d) being based on the sum of the components (a) to (c).

2. A process according to claim 1 wherein the microencapsulated monomer mixture comprises (a) 34 to 99.2% by weight of the monomer,
   (b) 0.6 to 15% by weight of the crosslinking agent,
   (c) 0.2 to 1% by weight of the aliphatic peroxyester, and
   (d) 0 to 50% by weight of additives.

3. A process according to claim 1 wherein the monomer is styrene.

4. A process according to claim 1 wherein the polymerization inhibitor is an unsubstituted hydroxyaromatic compound.

* * * * *